United States Patent
Udani et al.

(10) Patent No.: US 9,419,946 B2
(45) Date of Patent: Aug. 16, 2016

(54) METHOD AND APPARATUS FOR ANONYMOUSLY ACQUIRING SERVICE INFORMATION

(71) Applicant: Verizon Patent and Licensing Inc., Basking Ridge, NJ (US)

(72) Inventors: Sanjay K. Udani, Arlington, VA (US); Thomas Maguire, Vienna, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 330 days.

(21) Appl. No.: 13/934,524

(22) Filed: Jul. 3, 2013

(65) Prior Publication Data

US 2015/0012631 A1 Jan. 8, 2015

(51) Int. Cl.
- *G06F 15/173* (2006.01)
- *H04L 29/06* (2006.01)
- *G06Q 30/02* (2012.01)
- *H04W 4/02* (2009.01)

(52) U.S. Cl.
CPC ........ *H04L 63/0421* (2013.01); *G06Q 30/0283* (2013.01); *H04L 63/0407* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 8,527,292 | B1* | 9/2013 | Ozden | 705/2 |
| 9,202,230 | B2* | 12/2015 | Yarvis | G06Q 30/02 |
| 2006/0129444 | A1* | 6/2006 | Baeza | G06Q 10/109 705/7.19 |
| 2007/0233510 | A1* | 10/2007 | Howes | G06Q 30/0601 705/26.1 |
| 2008/0033869 | A1* | 2/2008 | Steele et al. | 705/38 |
| 2010/0017222 | A1* | 1/2010 | Yeluri et al. | 705/2 |
| 2011/0288882 | A1* | 11/2011 | Halow | 705/2 |
| 2013/0103529 | A1* | 4/2013 | Loveman | G06Q 30/08 705/26.2 |
| 2014/0108078 | A1* | 4/2014 | Davis | G06Q 10/063112 705/7.14 |
| 2014/0136443 | A1* | 5/2014 | Kinsey, II | G06Q 10/063116 705/347 |
| 2014/0337479 | A1* | 11/2014 | Stangas | 709/219 |
| 2014/0365327 | A1* | 12/2014 | Crossan et al. | 705/26.4 |

* cited by examiner

*Primary Examiner* — Joshua Joo

(57) ABSTRACT

An approach for enabling a user to anonymously access customized service information from a plurality of providers is described. A secure estimation platform retrieves personal information associated with a user based on a first request from the user. The platform then anonymizes the personal information and generates a second request for the estimate for the service based on the anonymized personal information. The second request is then transmitted to one or more providers of the service.

18 Claims, 11 Drawing Sheets

100

METHOD AND APPARATUS FOR ANONYMOUSLY ACQUIRING SERVICE INFORMATION

BACKGROUND

Personalized services such as healthcare, insurance, medical procedures or the like are known to many consumers to be costly. Moreover, the cost of the same service can vary widely across different providers (e.g., hospitals, care facilities, agencies). To address this issue, some consumers employ cost estimation tools to obtain estimates for the cost of services for a given region/locale. Unfortunately, the estimates are often generic and not customized to the specific history, preferences or criteria of the consumer.

Based on the foregoing, there is a need for enabling a user to anonymously access customized service information from a plurality of providers.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to the accessing of information from medical service providers such as hospitals, medical care facilities or the like, it is contemplated the approach described herein may be used in connection with any service where personalized, private information is required to be exchanged between a requesting user and the provider of said service. This may include, for example, services offered by insurance providers, financial service providers, investment service providers, housing providers, entertainment service providers, educational service providers, etc.

Figure 1:
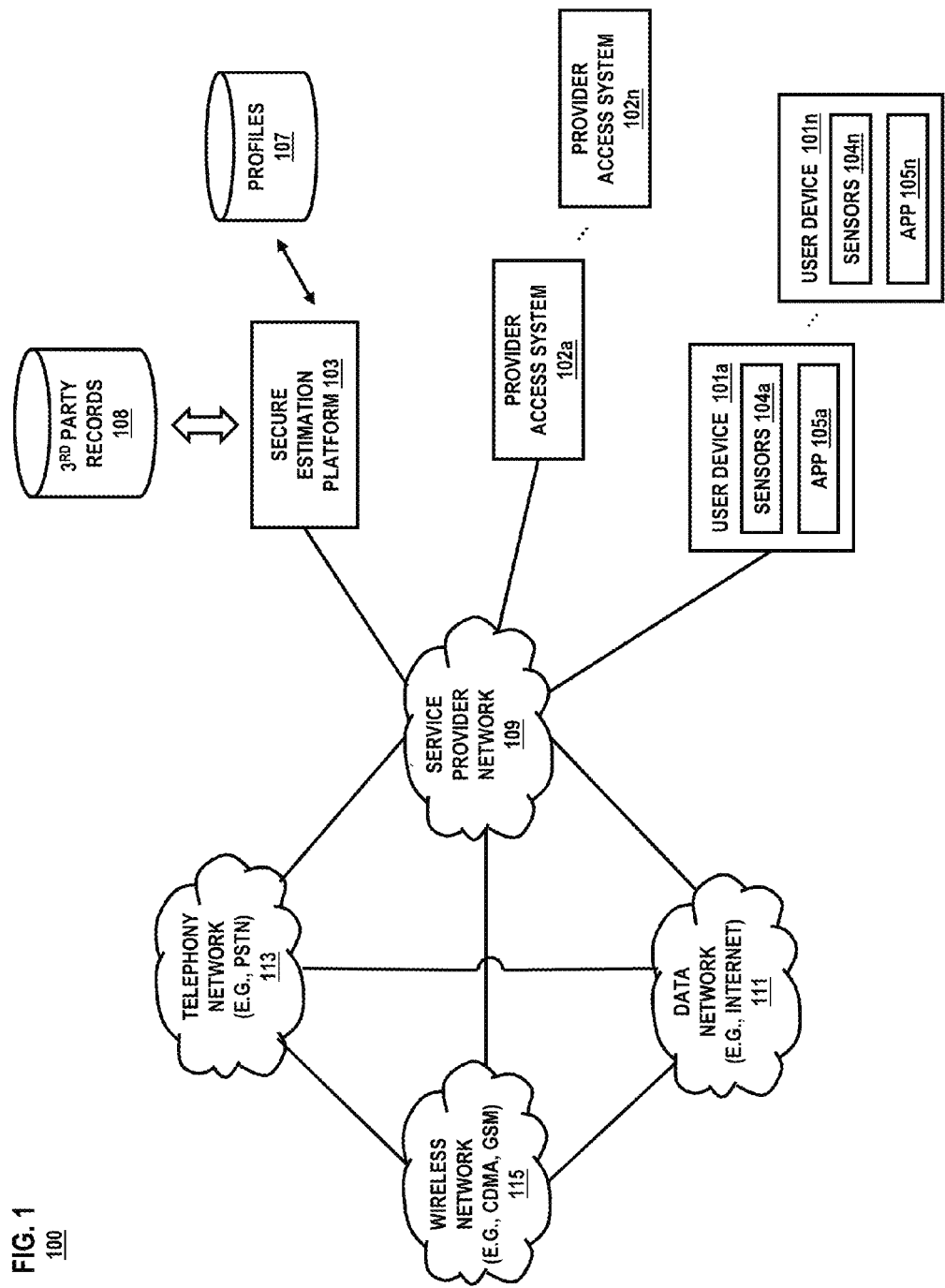
FIG. 1 is a diagram of a system for enabling a user to anonymously access customized service information from a plurality of providers, according to one embodiment.

FIG. 1 is a diagram of a system for enabling a user to anonymously access customized service information from a plurality of providers, according to one embodiment. By way of example, the system 100 includes a secure estimation platform 103 that is configured to interact with one or more user device 101a-101n, referred to herein as user devices 101, for providing personalized estimates. User devices may include, for example, a mobile device, smart phone, netbook, laptop, set-top box, or any communications enabled computing device. The personalized estimate, as acquired/generated by and presented to a user device 101 upon request, may specify cost information, availability information, type of service information or the like. As will be discussed further, the estimate is uniquely generated for a user based on private and/or personal information of the user.

Personalized services such as healthcare, insurance, medical procedures or the like are known to many consumers to be costly. Moreover, the cost of the same service can vary widely across different providers (e.g., hospitals, care facilities, agencies). For example, in the case of medical services, one hospital can charge significantly more for a certain procedure than another hospital despite the fact those hospitals are within the same region. Hence, consumers have very little authority in addressing such disparities given the lack of standards for services and the lack of transparency in billing procedures. It is not uncommon for the patient (even one with insurance) to not know what they owe until after the service is performed or how to decipher the billing statement.

Consequently, some consumers employ cost estimation tools to obtain estimates for the cost of services for a given region/locale. For example, the consumer may refer to a healthcare estimator application or website to obtain estimates of general services and procedures for hospitals within their city. Unfortunately, the estimates are often generic, as they only reflect the average cost at best of said services rather than the specific cost for the inquiring consumer. Moreover, the information provided is not customized to the specific medical history of the consumer, their current insurance provisions of unique preferences; factors that impact the actual cost and availability of a given service.

To address this problem, the system 100 of FIG. 1 enables users (e.g., consumers) to perform an inquiry for personalized services—i.e., those requiring the exchange of personal/sensitive information about the user to enable completion of the service—on an anonymous basis. By way of example, the anonymity refers to means of inquiry of one or more provider access systems 102a-102n (of various service providers) wherein only anonymized private/sensitive information regarding the user is presented to the service provider. Still further, the anonymity pertains to means of accessing user historical data, such as electronic medical records or current third party provider records, such as insurance information, in a manner that protects user privacy. Hence, it is noted that the secure estimation platform 103 may be configured to interact with the provider access systems 102a-102n, referred to herein as provider access systems 102, one or more third party records databases 108 for housing historical or current information regarding the user, etc., by way of anonymous information exchange and data acquisition.

In one embodiment, the secure estimation platform 103 is configured to interact with an estimation application 105a-105n of the respective user devices 101a-101n via a communication network (e.g., service provider network 109). The estimation application 105a-105n, referred to herein as estimation application 105, may be a standalone executable, browser based utility or the like for receiving user input. The inputs are received as one or more fields per a user interface generated by the application 105. Inputs may include, for example, an inquiry for a specific service to be performed or data representing a particular region/location of the user. The input may include the specification of one or more user preferences for narrowing/refining the search results, including a service provider ranking preference, a cost range preference, a location preference, etc. Still further, the input may also include sensor data as collected by the sensors 104a-104n of the respective user devices 101a-101n. This may include location information, temporal information and other contextual information regarding the user of the device 101.

Once the input is collected from the user via the user device 101a-101n, the estimation application 105 transmits the input to the secure estimation platform 103. Under this scenario, the input serves as search criteria and requirements data for enabling performance of a query by the secure estimation platform 103. Hence, the secure estimation platform 103 processes the request to initiate retrieval of estimates that match the criteria.

In one embodiment, the secure estimation platform 103 may be implemented as a managed or hosted solution or platform configured to receive and subsequently process the requests. For example, the secure estimation platform 103 may be a cloud based solution that is insulated from, but has secure access to, data maintained by the provider access systems 102. In addition, the secure estimation platform 103 may securely retrieve third party records 108 associated with a user based on the request. Alternatively, the secure estimation platform 103 may be distinct from the cloud infrastructure, but accessed via the cloud for facilitating the retrieval of estimates. Per this approach, the estimates are therefore returned to the cloud infrastructure by the secure estimation platform 103 for subsequent retrieval by a requesting user device 101.

It is noted that any implementation of the secure estimation platform 103 may be employed for use in connection with the embodiments herein, including software, hardware or firmware based implementations of said solution as well as remote or locally hosted platform versions. Regardless of the implementation, which may vary per the requirements of the provider of the secure estimation platform 103, the platform 103 may be configured to maintain profiles 107 regarding one or more registered users. In addition, profiles 107 regarding the one or more providers of the access systems 102 may also be maintained. This ensures the secure estimation platform 103 remains independent of the network to which the provider of the third party records 108 or provider access systems 102 are configured.

In the case of a user based profile, profile 107 may specify one or more user preferences regarding the services desired by the user. For example, in the case of a medical service, the preferences may include hospital or care facility ranking preferences (e.g., only 3 stars or above), location preferences, provider types (e.g., hospitals, clinics, specialty care facilities), service types (e.g., primary care, medical specializations, procedure types). As another example, the user profile 107 may also specify general contact information regarding the user as well as insurance carrier and policy details (e.g., carrier contact information, coverage limitations, in/out-of-network coverage criteria), payment preferences and other contextual information regarding the user. It is noted that the user profile may be generated during registration of the user for access to the secure estimation platform 103. This may also correspond to the occurrence of downloading or activation of the estimation application 105 to the respective user devices 101 of the user.

In the case of a provider based profile, the profile 107 may specify one or more preferences of a registered service provider. This may include, for example, the network location of the provider access systems 102 from which relevant information for generating estimates are to be acquired. As another example, the profile 107 may specify various service types, provider details, marketing information, service performance restrictions or policies, etc., for use in supporting user queries. It is noted that the provider profile may be generated at the time of registration of the provider for access to the secure estimation platform 103. Under this scenario, in the case of hospital service providers, different hospitals may register with the platform 103 per a service provider oriented registration process versus a user oriented registration process.

In one embodiment, the secure estimation platform 103 references the user profile 107 of the requesting user in response to receipt of a request. Based on the criteria specified within the request, the secure estimation platform 103 determines the nature of the request (e.g., the type of medical service or procedure required). This may include, for example, associating a keyword provided as input by the user with a specific genre, industry, service type or other label/definition element. It is noted that any known data mapping techniques, data tagging, referencing or other information association techniques may be performed.

In addition, the platform 101 may also reference the user profile 107 of the user to identify any requirements and/or preferences. For example, a user having limited access to transportation may specify a preference for only service providers within 5 miles of their present location. Under this scenario, the platform 103 may rely on location information collected via the one or more sensors 104a-104n, referred to herein as sensors 104, for determining an anchor point for fulfillment of the request. As another example, the user may specify a preference for only hospitals ranked above a certain threshold (e.g., 4 out of 5 stars) or that have high user review ratings. It is noted that the secure estimation platform 103 may be configured to automatically refer to the user profile 107 for requirements/preferences, the input specified per the request, or a combination thereof.

In one embodiment, the secure estimation platform 103 may also retrieve data from one or more third party records databases 108 in response to the request. The third party records may also be referenced via the profile 107, or alternatively, retrieved based on the type of or nature of the request. For example, in the case of a user seeking estimates for a specific type of medical procedure, the secure estimation platform 103 may retrieve insurance information associated with the user from their insurance carrier. Similarly, the platform 103 may access electronic medical records pertaining to the user (e.g., a medical information bureau report) based on a reference identifier specified within the profile 107. Retrieval of said information may be acquired from the third party records database 108 in contrast to inclusion of the data as part of the profile 107. This separation enables decoupling of the profile 107 from the record 108 for maintaining a level of data privacy. In addition, the secure estimation platform 103 anonymizes the data for the purpose maintaining anonymity of the user as the third party records 108 are retrieved. It is noted that the user profile 107 may include one or more policies and/or agreements for opting to share anonymous data associated with the user via the secure estimation platform 103, including the sharing of said requirements/preferences.

By way of example, the secure estimation platform 103 may submit a request for access to the electronic medical records of the user to the server maintaining said records 108 based on a unique identifier of the user. This may include a social security number or patient identifier value. The request may be submitted agnostically to the server housing such that no reference is made to the request type, requirements, criteria, etc., as submitted by the user via the estimation application 105. Once the medical records are found, the secure estimation platform 103 anonymizes the incoming data based on any known or still developing data standardization, data extraction or cleansing scheme. This may include, for example, removing, masking, or replacing any personal, sensitive or identifying information related to the user as contained within the medical record. Still further, the anonymization procedure may include standardizing various fields of the medical record for optimal, subsequent processing by the secure estimation platform 103 in association with the initial user request.

Once received, the secure estimation platform 103 processes the profile 107, the specified/submitted user inputs, relevant data pulled from the emergency medical records, insurance records, etc., to identify a one or more service providers that align with the preferences and requirements of the user. This may include employing the use of a search algorithm, query procedure or any known or still developing data mining and acquisition techniques. Based on the results, the secure estimation platform 103 then submits a request for estimate information to the provider access systems 102 of the relevant health care providers. It is noted that the estimate request is limited to only those service providers (e.g., hospitals) that best satisfy the user request, such as to within a predetermined threshold of affinity. It is also noted that the estimate request is directed to only those service providers that are registered with the secure estimation platform 103 (e.g., participating service providers).

In one embodiment, the estimate request is submitted in anonymous form, such that no identifying information regarding the user may be associated with the third party record (e.g., electronic medical record, insurance information, banking information) as directed to the provider access system 102. As such, the service provider is able to generate an estimate, proposal, quote or the like that is best suited for the user based on relevant contextual details regarding the user (e.g., medical issues, age, background) without knowledge of the user's identity.

In one embodiment, the secure estimation platform 103 receives the estimates from the access systems 102 of the relevant participating services providers. The secure estimation platform 103 then transmits the estimate to the estimation application 105 of the requesting user device 101. This transmission corresponds to initiating of an application programming interface (API) at the user device 101, per the application 105, for enabling presenting of the estimates. It is noted that the secure estimation platform 103 may interact with the provider access systems 102 to coordinate the timing and delivery of the estimates. This may include, for example, ensuring the receipt of information from all participating access systems 102 per a request, initiating resubmissions for estimates and packaging of the estimates for presentment to the platform 103 for presentment at a user device 101. Of note, the secure estimation platform 103 may interact with any number of provider access systems 102 for receiving any number of estimates.

In one embodiment, the estimates may be rendered to a user interface of the estimation application 105 in various forms. For example, the estimates from the different providers may be presented in a side-by-side manner for enabling the user to easily compare the estimates and associated features thereof. The estimates may include cost information regarding the service to be performed, availability information for indicating one or more dates/times for performance of the service, procedural details and the like. In addition, the estimates may include contact information regarding the service provider, background information regarding the service provider, marketing information, service provider ratings and any information deemed relevant to addressing the requirements and preferences of the user. It is noted that presentment of the estimates as a side-by-side comparison supports convenient user review of relevant information for evaluating various service provider offerings.

In one embodiment, the secure estimation platform 103 may also initiate the arranging of or selection of a given service to be performed in response to presentment of the estimates. This may include, for example, receiving an input for indicating a selection of a particular estimate to be scheduled to be performed. In the case of a medical service, when the user decides to schedule an appointment with a provider, the secure estimation platform 103 may initiate contact with the provider access system 102 or an internal scheduling system of the provider. The platform 103 then transfers relevant user information, including the preferred date and contact credentials of the user, to the provider accordingly. In addition, the user may opt to enable transmission of their medical record to the service provider. The scheduling procedure may be performed by way of direct signal communication between the secure estimation platform 103 and an access system 102.

In one embodiment, the secure estimation platform 103 may also generate one or more recommendations for the user based on the requirements and preferences, third party record information, contextual information regarding the user, or a combination thereof. For example, based on the medical history of the user, the secure estimation platform 103 may recommend that a user consider a care facility that specializes in treatment pertinent to the user's history despite a higher rating of another hospital. As another example, based on the insurance information related to the user, the secure estimation platform 103 may recommend that a user consider an out-of-network specialist with a cost structure for a given service that is similar to an in-network non-specialist. The recommendations provided may vary based on the preferences and requirement of the user, the level of sensitivity of the secure estimation platform 103 to contextual conditions established by the user, the availability of providers, etc. It is noted that the recommendations may be presented either prior to accessing of the one or more estimates or afterwards, thus supporting the user's ability to direct the outcome of the estimate as well as their ability to interpret the results.

In yet another embodiment, the secure estimation platform 103 also generates reports regarding a service as performed. For example, the secure estimation platform 103 may detect an updating of the user's electronic medical record or may receive billing details from the provider in response to performance of a medical procedure. The platform 103 may further audit the billing records to determine if any discrepancies exist. Under this scenario, the secure estimation platform 103 may generate a discrepancy report for presenting any possible billing errors. In addition, the report may provide feedback information to the user for indicating what a typical billing statement for the same service provider, procedure or region is. It is contemplated that the user may generate customized reports by way of a configuration interface of the secure estimation platform 103.

It is noted that in addition to maintaining anonymity of the requesting user, the secure estimation platform 103 may also operate in accordance with known privacy policies and regulations. For example, the electronic medical records or other third party records may be acquired and maintained in accordance with known regulations such as the health insurance portability and accountability act (HIPAA). Hence, the standardization procedure performed by the platform 103 is performed in a manner that maintains compliance standards. This further supports the ability of the user to receive on demand, customized estimates regarding a service without requiring the user to provide any non-anonymized information to the service provider.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In certain embodiments, user devices 101a-101n, the secure estimation platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
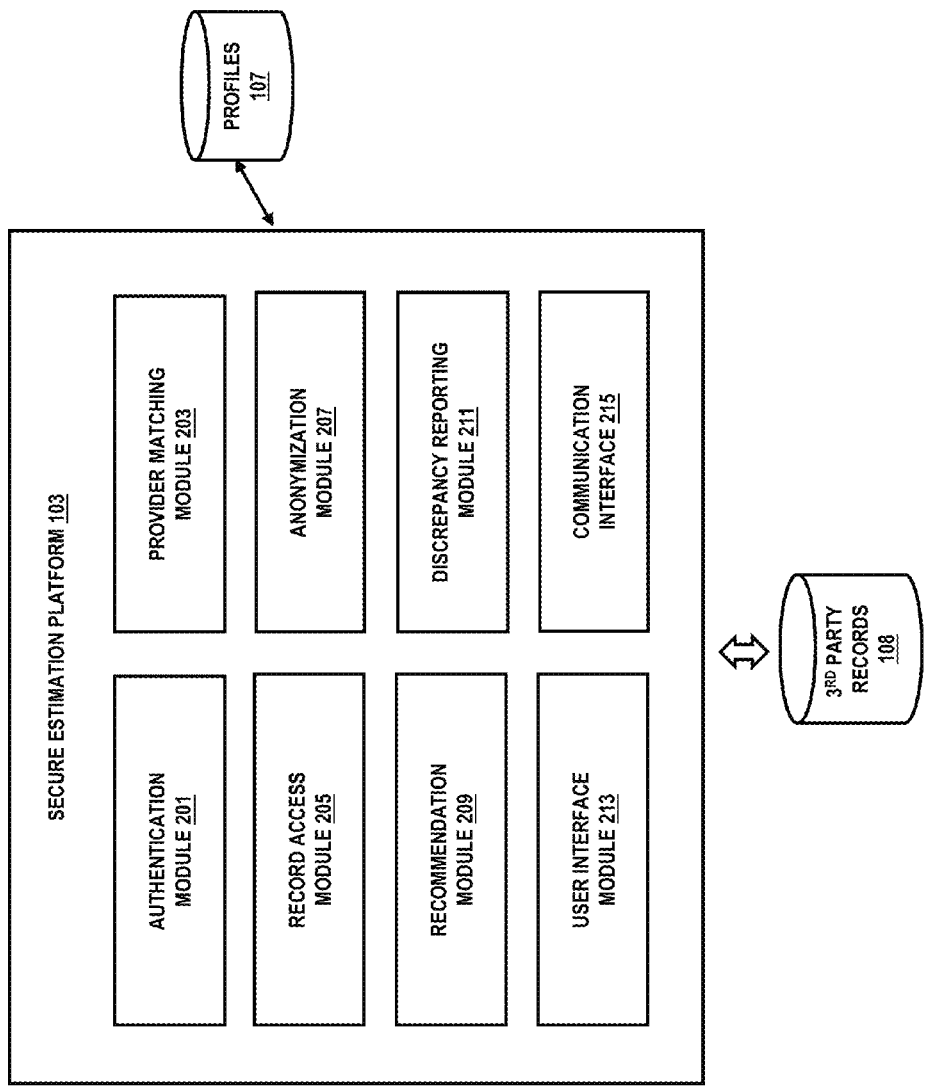
FIG. 2 is a diagram of the components of a secure estimation platform of FIG. 1, according to one embodiment.

FIG. 2 is a diagram of the components of a secure estimation platform of FIG. 1, according to one embodiment. It is contemplated that the functions of these components may be combined in one or more components or performed by other components of equivalent functionality. Such modules can be implemented in hardware, firmware, software, or a combination thereof. By way of example, the secure estimation platform 103 may include an authentication module 201, provider matching module 203, record access module 205, anonymization module 207, recommendation module 209, reporting module 211, user interface module 213 and communication interface 215.

In addition, the secure estimation platform 103 also accesses profiles data from a profile database 107, the database maintaining information pertaining to users or service providers that subscribe to the secure estimation platform 103. Also, the secure estimation platform 103 may also access third party records, such as electronic medical records, insurance information and other private or sensitive information pertaining to a user. It is noted that modules 201-215 may access the various databases 107 and 108 for performing several of its functions.

In one embodiment, an authentication module 201 authenticates users and user devices 101a-101n for interaction with the secure estimation platform 103. In addition, the authentication module 201 authenticates service providers for interaction with the secure estimation platform 103, i.e., for enabling the provisioning of information regarding their services. By way of example, the authentication module 201 receives a request from a user to subscribe to the service for enabling [some benefit]. The subscription process may include, from the perspective of the user, completing of an online registration form. Similarly, the service provider may complete a registration form. In addition, the registrants may download an estimation application 105 to their respective devices. Still further, the registrant may establish various preferences and settings to be maintained as profile data 107.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 213). Registration data for respective subscribers, which contains pertinent user or device profile data, may be cross referenced as part of the login process. Alternatively, the login process may be performed through automated association of profile settings maintained as registration data with an IP address, a carrier detection signal of a user device, mobile directory number (MDN), subscriber identity module (SIM) (e.g., of a SIM card), radio frequency identifier (RFID) tag or other identifier.

Still further, the authentication module 201 may also be configured to receive requests from various devices 101 for activation of an estimate. By way of this approach, having authenticated a device 101, the authentication module 201 alerts the provider matching module 203 of the request. In one embodiment, the provider matching module 203 determines which service provider access system 102 is best suited for, or matches, the estimation request. This includes processing the request to determine one or more requirements or preferences specified by the user. In addition, the provider matching module 203 may interpret the request type (e.g., the nature of the medical procedure) as well as access the profile 107 associated with the user to identify any established preferences (e.g., hospital ranking preferences).

The provider matching module 203 also processes sensor data received from the requesting user device 101, including location data, temporal data or other contextual information. Contextual information may be processed to determine which service provider matches a location condition or user time/availability condition. Still further, in one embodiment, a record access module 205 is called upon in connection with the provider matching module 203 to access third party records associated with the user. This may include, for example, pulling of the record from the database 108 anonymously; wherein an anonymization module 207 pulls relevant data from the third party record based on one or more anonymization rules and/or schemas.

The provider matching module 203 processes the profile 107, the specified/submitted user inputs, relevant data pulled from the third party records 108 (e.g., electronic medical records, insurance records) and the context information to identify which service providers align with the preferences and requirements of the user. By way of example, the provider matching module 203 may execute a search algorithm, query procedure or any known search procedure for performing the matching. Based on the results, the secure estimation platform 103 then submits a request for estimate information to the provider access systems 102 of the relevant health care providers. It is noted that the estimate request is limited to only those service providers (e.g., hospitals) that best satisfy the user request, such as to within a predetermined threshold of affinity. Also, the estimate request is submitted in anonymous form, such that no identifying information regarding the user may be associated with the estimate request as directed to the provider access system 102.

In one embodiment, the recommendation module 209 receives the estimates from the access systems 102 of the relevant participating services providers. The secure estimation platform 103 then transmits the estimate to the estimation application 105 of the requesting user device 101 via the communication interface 215. In addition, the recommendation module 209 may generate one or more recommendations for the user based on the requirements of the user, the user preferences or the estimate results returned by the different matching provider access systems 102. The recommendations provided may vary based on the preferences and requirement of the user, the level of sensitivity of the secure estimation platform 103 to contextual conditions established by the user, the availability of providers, etc.

In another embodiment, the discrepancy reporting module 211 generates reports regarding a service performed by a provider. For example, the discrepancy reporting module 211 may detect an updating of the user's electronic medical record or may receive billing details from the provider in response to performance of a medical procedure. Based on this, the discrepancy reporting module 211 may generate a discrepancy report for presenting any possible billing errors. In addition, the report may provide feedback information to the user for indicating what a typical billing statement for the same service provider, procedure or region is. The report may be transmitted to the user device 101 by way of the communication interface 215.

In one embodiment the user interface module 213 enables presentment of a graphical user interface for rendering a registration interface or configuration interface of the secure estimation platform 103. By way of example, the user interface module 215 generates the interface during registration of a user or service provider for access to the platform 103. The user interface module 213 may initiate the execution of various application programming interfaces (APIs) or other function calls corresponding to the application 105 of the user devices 101*a*-101*n*; thus enabling the display of graphics primitives.

In one embodiment, a communication module 215 enables formation of a session over a network 109 between the secure estimation platform 103 and the estimation application 105. By way of example, the communication module 215 executes various protocols and data sharing techniques for enabling collaborative execution between a user device 101*a*-101*n* (e.g., mobile devices, laptops, smartphones, tablet computers, desktop computers) and the secure estimation platform 103 over the network 109.

The above presented modules and components of the secure estimation platform 103 can be implemented in hardware, firmware, software, or a combination thereof. Though depicted as a separate entity in FIG. 1, it is contemplated that the platform 103 may be implemented for direct operation by respective UEs 101*a*-101*n*. As such, the secure estimation platform 103 may generate direct signal inputs by way of the operating system of the UE for interacting with the estimation application 105. In another embodiment, one or more of the modules 201-215 may be implemented for operation by respective user devices, as a platform 103, or combination thereof.

Figure 3B:
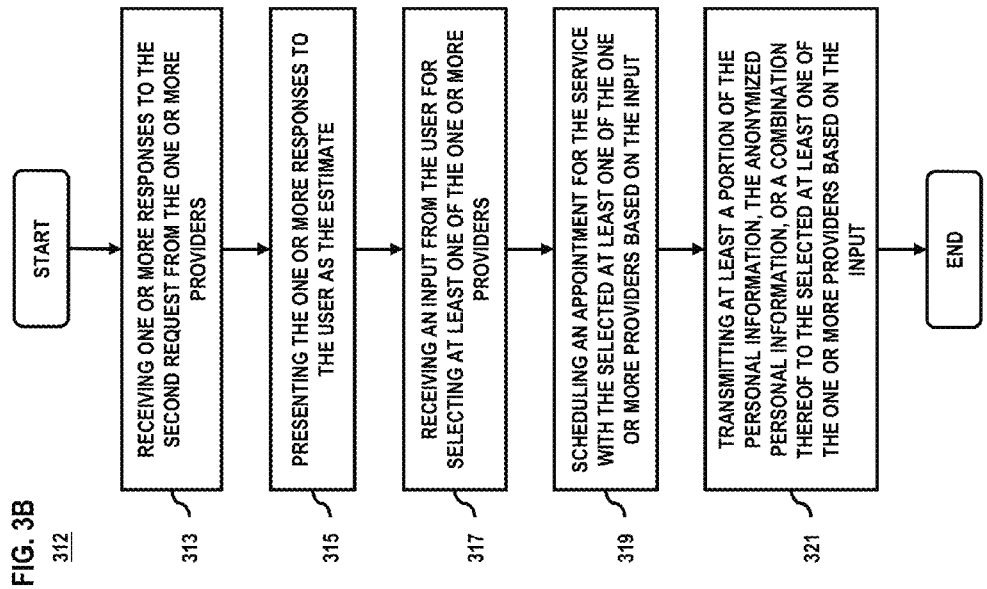
FIGS. 3A-3C are flowcharts of processes for enabling a user to anonymously access customized service information from a plurality of providers, according to various embodiments.
Figure 3A:
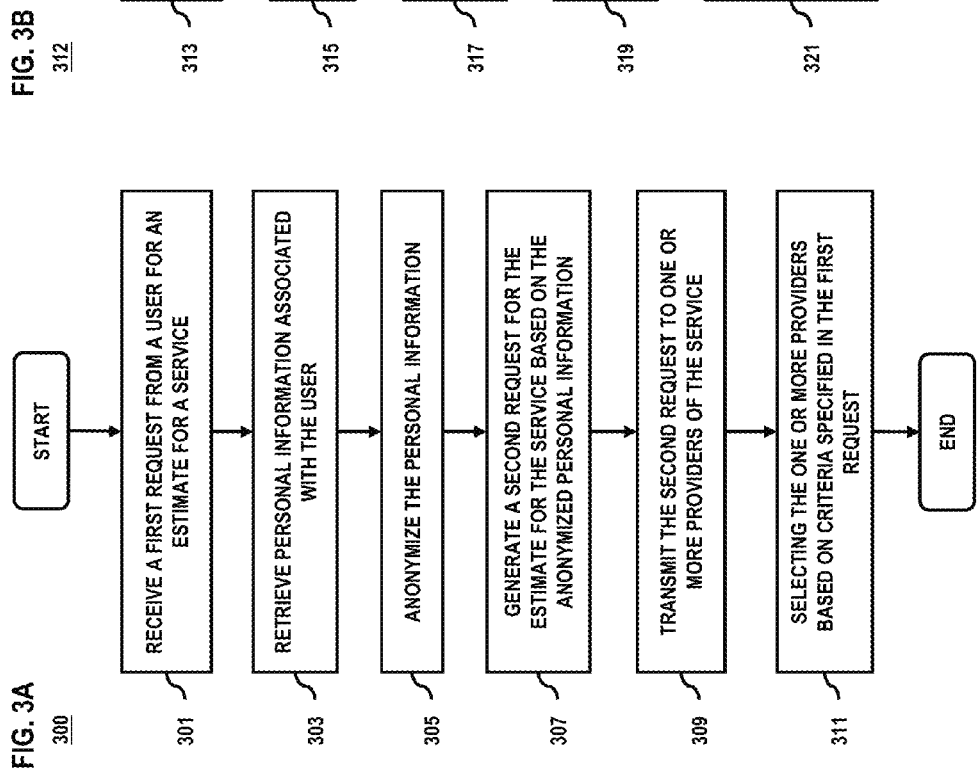
Figure 3C:
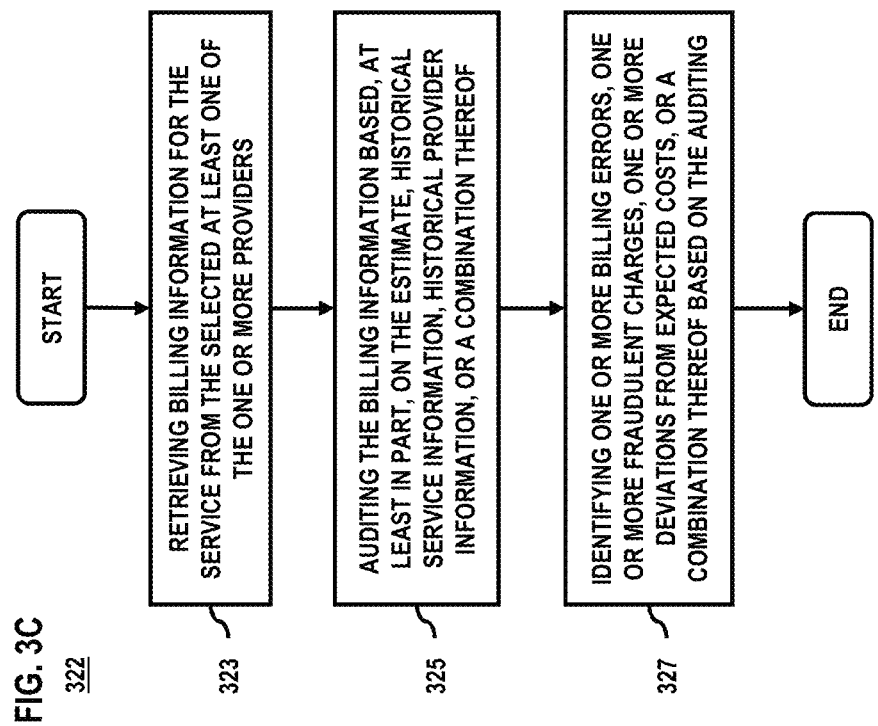

FIGS. 3A-3C are flowcharts of processes for enabling a user to anonymously access customized service information from a plurality of providers, according to various embodiments. In one embodiment, the secure estimation platform 103 performs the processes and is implemented in, for instance, a chip set including a processor and a memory as shown in FIG. 11. For the purpose of illustration, the processes are described with respect to FIG. 1. It is noted that the steps of the process may be performed in any suitable order, as well as combined or separated in any suitable manner.

In step 301 of process 300, the secure estimation platform 103 receives a first request from a user for an estimate for a service. As noted previously, the first request may be initiated by processing sensor information associated with the device to determine a need for the service. In steps 303 and 305, the platform 103 retrieves personal information associated with the user and then anonymizes the personal information. It is noted that the first request may specify one or more user provided inputs for indicating the request type or one or more user preferences and/or requirements. The first request may therefore establish one or more service providers that may match a desired estimate.

Per step 307, the secure estimation platform 103 generates a second request for the service based on the anonymized personal information. In another step 309, the platform 103 further transmits the second request to one or more providers of the service. It is noted that the second request may correspond to submission of requests for estimates from one or more service providers. In step 311, the platform 103 selects the one or more providers based on criteria specified in the first request, wherein the estimate is representative of cost information, availability information, type of service information, or a combination thereof.

In step 313 or process 312 (FIG. 3B), the secure estimation platform 103 receives one or more responses to the second request from the one or more providers, wherein the one or more responses include service cost information, service availability information, type of service information, or a combination thereof. In another step 315, one or more responses to the user are presented as the estimate. As noted previously, the responses are rendered to an interface of the user device, such as in accordance with a side-by-side comparison. This supports convenient analysis of the various offerings of the different service providers by the user. In addition, multiple service providers are able to compete against one another for fulfillment of the user request.

In step 317, the secure estimation platform 103 receives an input from the user for selecting at least one of the one or more providers. This corresponds to selection of one of the service providers as presented. In another step 319, the platform 103 schedules an appointment for the service with the selected at least one of the one or more providers based on the input. Per step 321, the platform 103 further transmits at least a portion of the personal information, the anonymized personal information, or a combination thereof to the selected at least one of the one or more providers based on the input. It is noted, therefore, that the platform 103 facilitates the immediate and seamless arranging of the service as a further means of convenience for the user.

In step 323 of process 322 (FIG. 3C), the secure estimation platform 103 retrieves billing information for the service from the selected at least one of the one or more providers. The billing information is based on performance of a selected service by a service provider. In another step 325, the secure estimation platform 103 audits the billing information based, at least in part, on the estimate, historical service information, historical provider information, or a combination thereof. Based on the audit, the platform 103 identifies one or more billing errors, one or more fraudulent charges, one or more deviations from expected costs, or a combination thereof.

FIGS. 4A-4E are diagrams of user interfaces utilized in the processes of FIGS. 3A-3C, according to various embodiments. By way of example, the diagrams pertain to interfaces of a user device 401 for enabling a user to submit a request for estimates regarding a medical service. The requests are submitted from the user device 401 by way of an estimation application 403, which is registered for interaction with the secure estimation platform 103 in advance. In addition, the diagrams pertain to a reporting interface of the secure estimation platform 103 (per interaction with the estimation application) for providing the user of the device 401 with feedback regarding a service as performed by a selected provider.

Figure 4A:
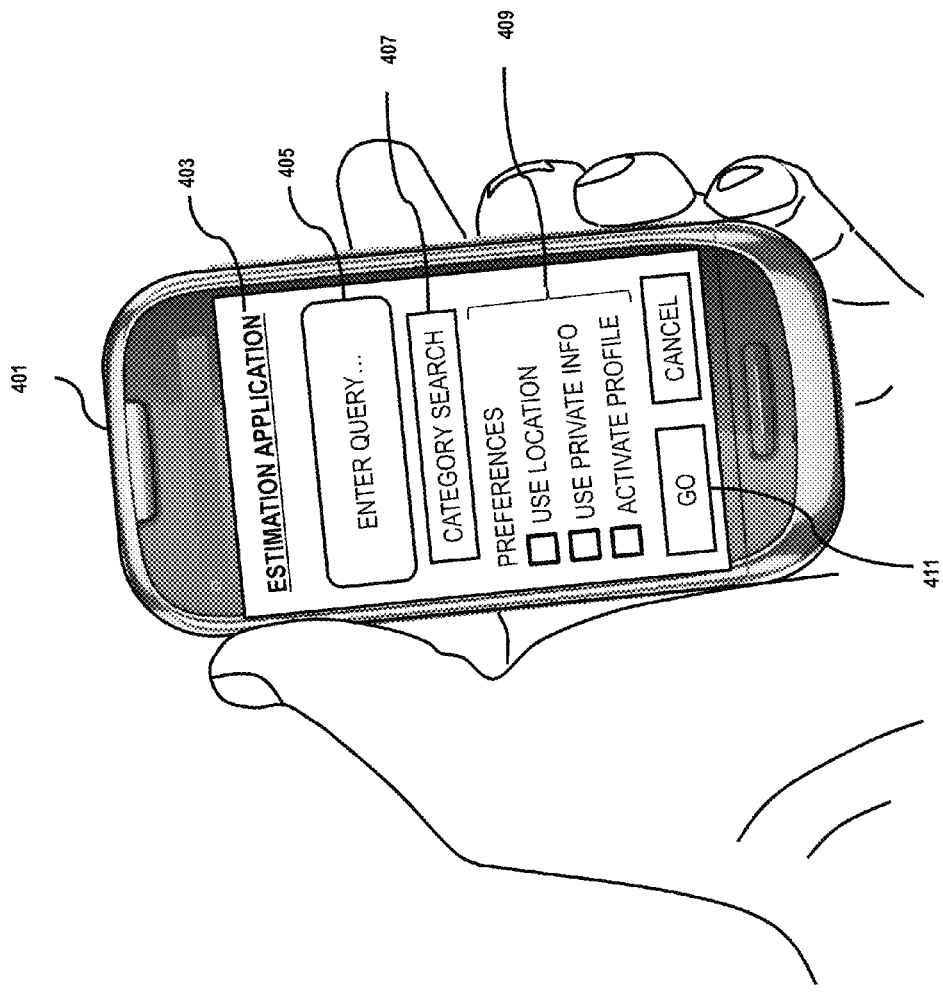
FIGS. 4A-4E are diagrams of user interfaces utilized in the processes of FIGS. 3A-3C, according to various embodiments.

In FIG. 4A, an estimation application 403 features various selection options and fields for enabling user input. A query input field 403 is presented for enabling the user to submit a text based request for a particular service. For example, in the case where the user wants to inquire about medical service providers that specialize in ankle injuries, the user may enter the keywords "ankle injury" into the field 405. Alternatively, a category search button 407 may be selected by the user for performing a category based search of providers that may specialize in knee related injuries. While not shown, the category search may invoke an additional menu or interface for presenting a categorized listing of medical specialties or categories.

The user may also be presented with various preference options 409 for activating or specifying one or more preferences. For example, the user may select a checkbox to permit the usage of current location information in performing a request search. In addition, the user may also select a checkbox to permit the use of their private medical information for enabling processing of the request. This may correspond to an opt-in procedure, wherein the electronic medical record of the user is allowed to be retrieved by the secure estimation platform 103 on an anonymous basis.

Still further, another checkbox may be presented for selection for enabling the user to activate an existing user profile. Under this scenario, the existing profile may indicate one or more service provider preferences, including a preferred hospital rating/ranking, preferred location radius, facility type preferences, etc. It is noted that activation of the profile enables the secure estimation platform 103 to account for existing preferences of the user as well as any additional input requirements rendered via the application 403.

Figure 4B:
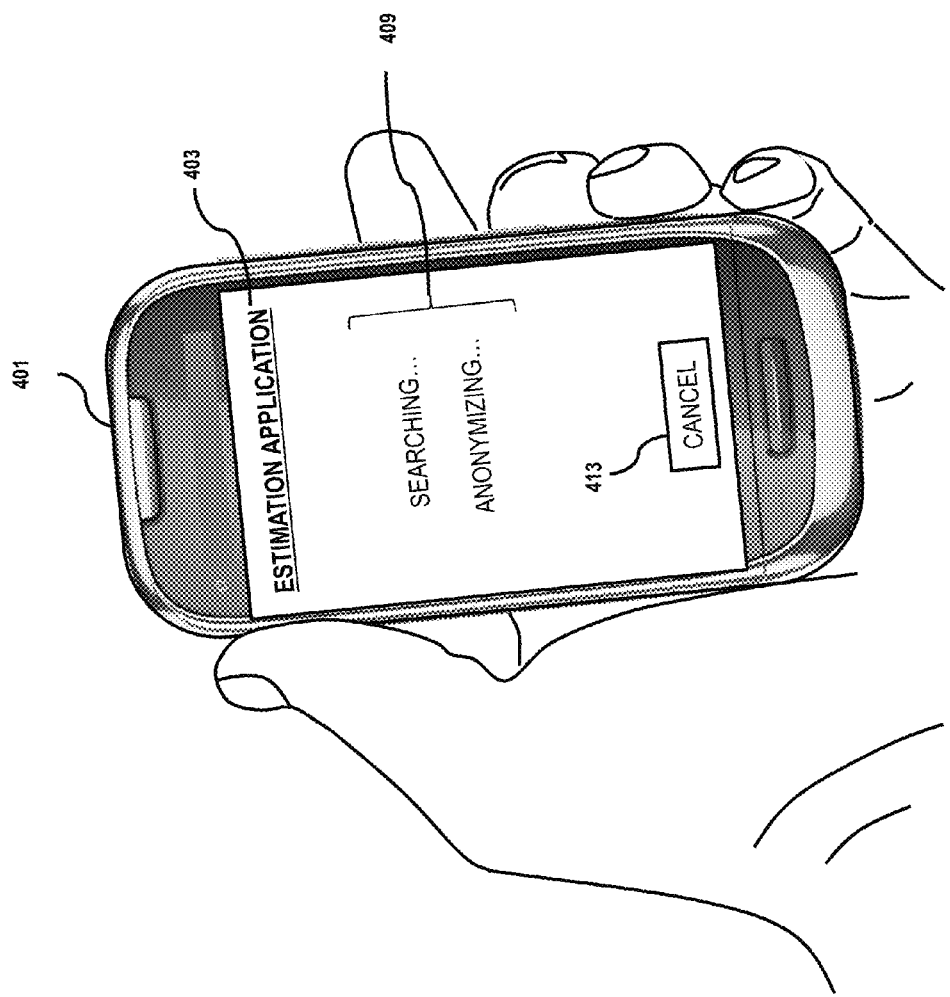

Once the input is provided, the user may then select the GO action button 411 to initiate submission of the request. This causes the estimation application 403 to update the interface view to present a status of the request, as shown in FIG. 4B. By way of example, a notification message 409 is presented to indicate that the platform 103 is searching for providers that match the request as well as anonymizing the user data for security purposes. The user is also presented with a CANCEL action button 413 for cancelling the request if desired.

Figure 4C:
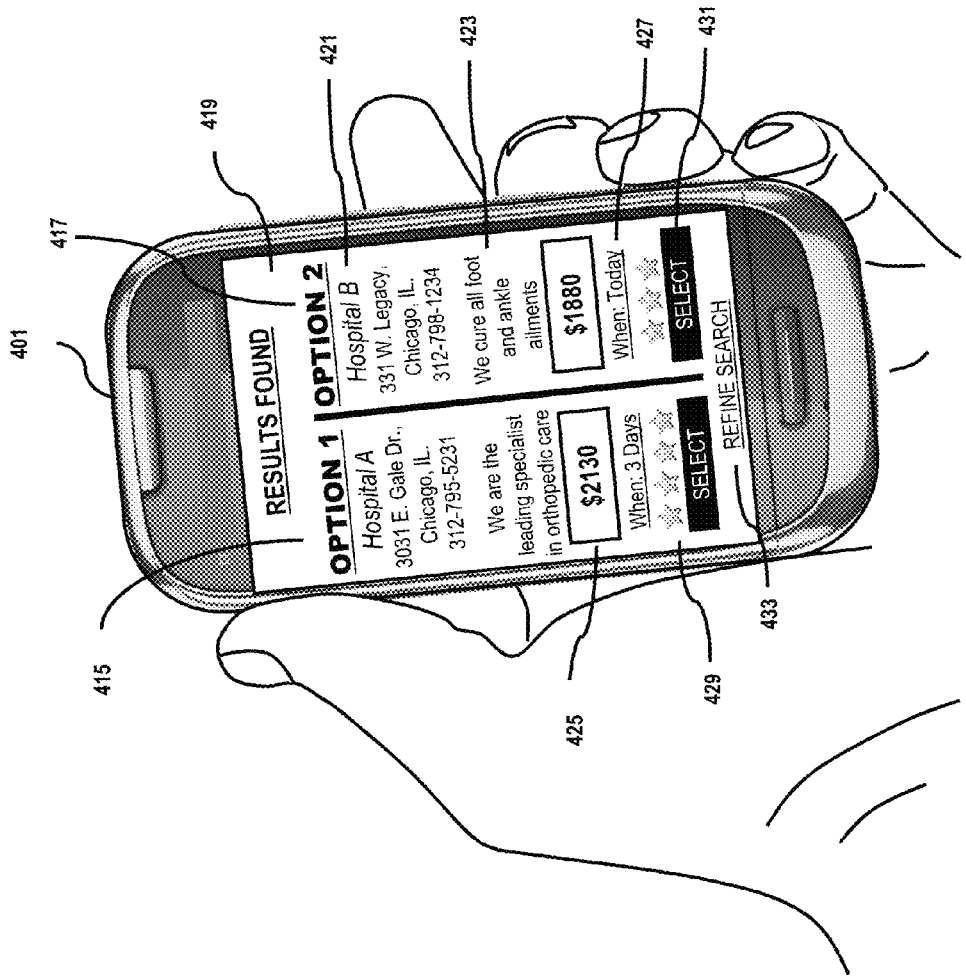

In FIG. 4C, a results interface 419 is rendered to the user. Via this interface 419, the user is presented with various options 415 and 417 to choose from in response to the request for providers that handle ankle injuries. Under this scenario, the options are presented in a side-by-side comparison format for indicating various details regarding the different providers. The details include the name and contact information for the hospital (e.g., 421). Also presented is an advertising caption 423 for indicating the specialty or niche of the different service providers (e.g., 423). Price estimates (e.g., 425) are also presented along with availability information (e.g., 427) for indicating a relative cost and date/time that the ankle injury service can be fulfilled. As noted, the cost and availability information is generated based, at least in part, on known medical history and details for the user, thus enabling a more accurate estimate to be rendered. Ranking information is also presented (e.g., 429) for each service provider.

Upon review, the user has the option of selecting a particular service provider to address the ankle injury by activating the SELECT action button (e.g., 431) corresponding to the particular service provider. Alternatively, the user may refine the search by selecting the refine search link 433.

Figure 4D:
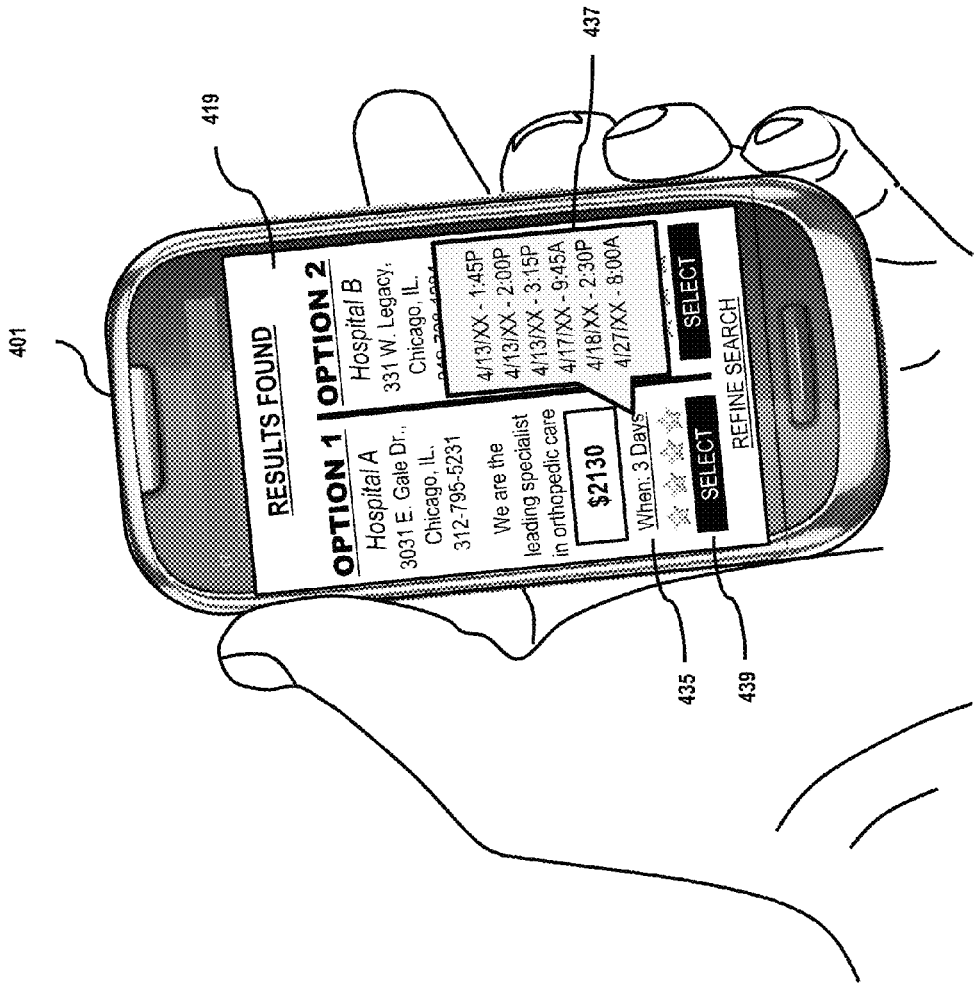
Figure 4E:
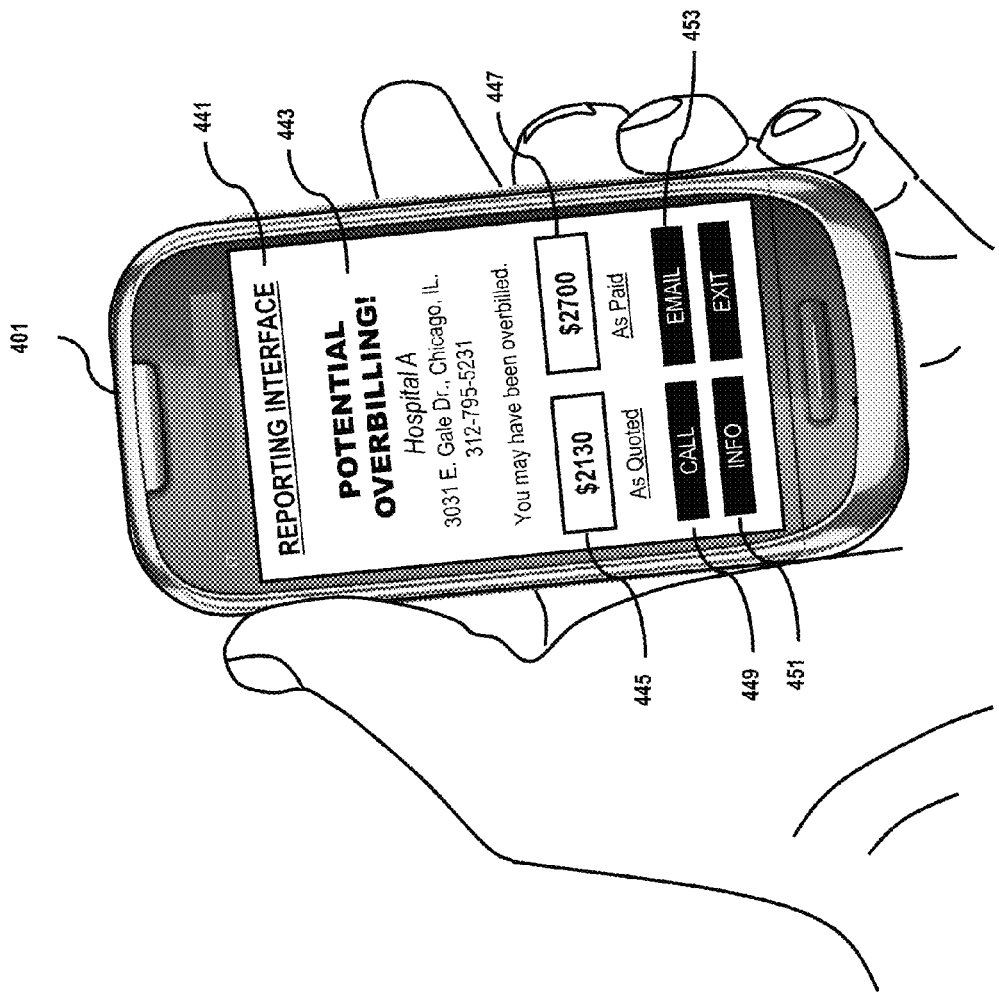

In FIG. 4D, the user may also schedule their preferred service directly from the results interface 419. For example, the user may activate the availability information link 435 of a given service provider option to invoke a calendar view 437. The calendar view may present the user with various dates and times that are available for scheduling the ankle injury care appointment. Once the user selects a date and time, activation of the SELECT action button 439 causes the secure estimation platform 103 to submit the request to the chosen service provider. As a result, the provider access system 102 of the selected service provider may place the user in the internal scheduling system of the hospital (e.g., Hospital A in this case) as well as facilitate submission of the electronic medical records and insurance information for that user.

It is further contemplated that the check-in procedure for the user may be optimized upon arrival by enabling the use of near-field communication or other wireless information exchange at the provider site. For example, having facilitated the sharing of their medical and insurance information in advance via the estimation application 419, the user may tap a NFC tag at the check-in desk of the provider to facilitate electronic signature and verification. As another option, the user may recall a reservation confirmation receipt as delivered to the user device 401 at the time of scheduling and present this reservation to the receptionist at the front desk for scanning. The scanning procedure may be performed in connection with an authentication procedure for validating the check-in of the user in connection with the original request submission.

In FIG. 4D, upon completion of the service, the user may be subsequently presented with a reporting interface 441 of the estimation application 403. Alternatively, the report may be presented as a document and rendered to the user in the form of a flat file, email, text message, etc. Under this scenario, the report includes a message 443 for indicating that the user may have been overbilled for their service as performed by Hospital A. The report also includes information for indicating the estimated amount for the service 445 as originally quoted versus that which was actually billed 447 to the user. In response to this information, the user may then initiate a call or send an email to the service provider by selecting the CALL or EMAIL action buttons 449 and 453 respectively. Alternatively, the user may select an INFO action button 451 to request or view more information regarding the discrepancy, i.e., an itemized billing list for indicating all of the charges accessed to the user.

The exemplary techniques and systems presented herein enable secure, anonymous and convenient access to useful information regarding services offered by different service providers. By way of example, the system presented herein support the rendering of customized/personalized estimates that reflect the requirements, preferences and contextual and historical characteristics of the user. In addition, one or more service providers may employ the user of the system as a means of reaching consumers and competing in the marketplace.

The processes described herein for enabling a user to anonymously access customized service information from a plurality of providers may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
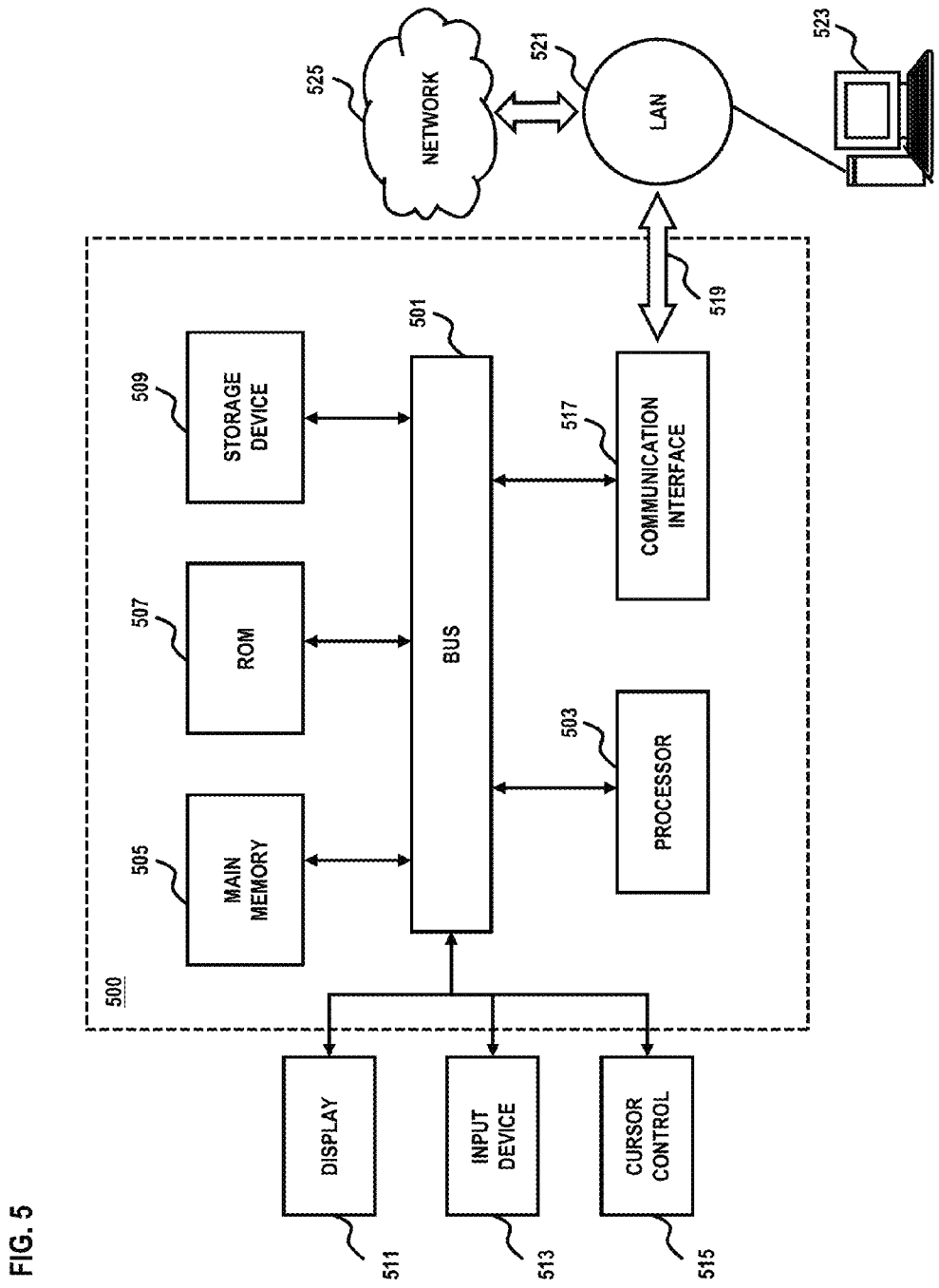
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4E, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
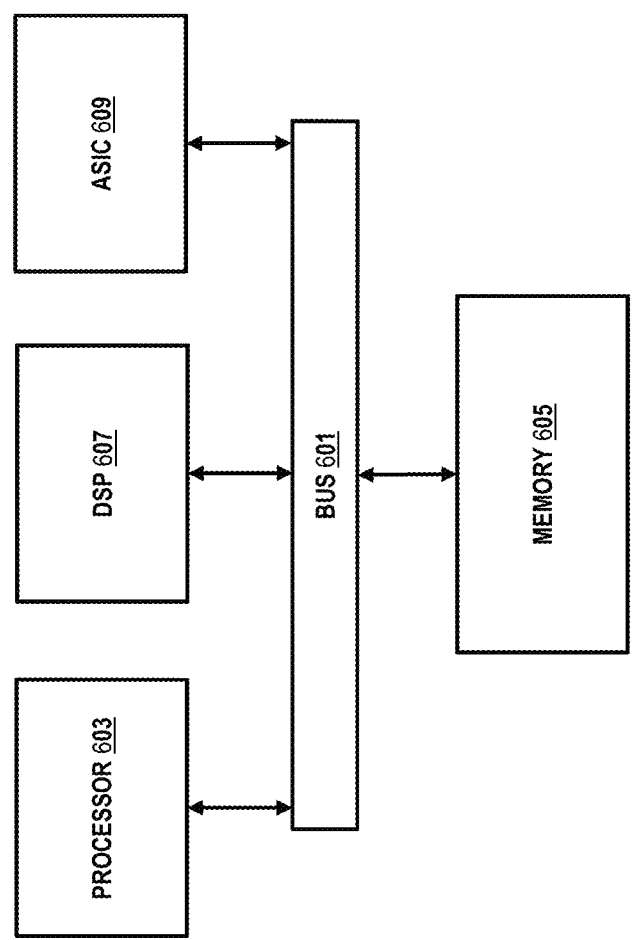
FIG. 6 is a diagram of a chip set that can be used to implement an embodiment of the invention.

FIG. 6 illustrates a chip set or chip 600 upon which an embodiment of the invention may be implemented. Chip set 600 is programmed to enable a user to anonymously access customized service information from a plurality of providers as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling a user to anonymously access customized service information from a plurality of providers.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable a user to anonymously access customized service information from a plurality of providers. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
   receiving a first request from a user, via a user device, for an estimate for a service, wherein the first request specifies criteria including a requirement that a provider of the service meet a predetermined threshold ranking for providers of the service based on user review ratings,
   wherein the user device includes two or more sensors providing sensor data including location data and temporal data, and
   wherein the first request is initiated by processing the sensor data to determine a need for the service;
   retrieving personal information associated with the user from a third party records database in response to the first request;
   anonymizing the retrieved personal information;

generating a second request for the estimate for the service based on the anonymized personal information;
transmitting the second request to one or more providers of the service;
receiving one or more responses to the second request from the one or more providers, wherein the one or more responses include service cost information, service availability information, or a combination thereof; and
presenting the one or more responses to the user as the estimate,
wherein at a time of presenting two or more responses to the user from two or more providers, presenting the two or more responses in side by side view on the user device, and presenting a recommendation, based on the retrieved personal information, that the user use one of the two or more providers even though the ranking of the one provider is lower than the other of the two or more providers.

2. A method of claim 1, further comprising:
selecting the one or more providers based on the criteria specified in the first request,
wherein the estimate is representative of cost information, availability information, type of service information, or a combination thereof.

3. A method of claim 2, wherein the criteria include a location, a date, a provider rating, or a combination thereof.

4. A method of claim 1, further comprising:
receiving an input from the user for selecting at least one of the one or more providers.

5. A method of claim 4, further comprising:
scheduling an appointment for the service with the selected at least one of the one or more providers based on the input.

6. A method of claim 5, further comprising:
transmitting at least a portion of the personal information, the anonymized personal information, or a combination thereof to the selected at least one of the one or more providers based on the input.

7. A method of claim 4, further comprising:
retrieving billing information for the service from the selected at least one of the one or more providers; and
auditing the billing information based, at least in part, on the estimate, historical service information, historical provider information, or a combination thereof.

8. A method of claim 7, further comprising:
identifying one or more billing errors, one or more fraudulent charges, one or more deviations from expected costs, or a combination thereof based on the auditing.

9. A method of claim 1, wherein the service is a medical service, and wherein the personal information includes an electronic medical record, insurance information, contextual information associated with the user, or a combination thereof.

10. An apparatus comprising a processor configured to:
receive a first request from a user, via a user device, for an estimate for a service, wherein the first request specifies criteria including a requirement that a provider of the service meet a predetermined threshold ranking for providers of the service based on user review ratings,
wherein the user device includes two or more sensors providing sensor data including location data and temporal data, and
wherein the first request is initiated by processing the sensor data to determine a need for the service;
retrieve personal information associated with the user from a third party records database in response to the first request,
anonymize the retrieved personal information,
generate a second request for the estimate for the service based on the anonymized personal information,
transmit the second request to one or more providers of the service,
receive one or more responses to the second request from the one or more providers, wherein the one or more responses include service cost information, service availability information, or a combination thereof, and
present the one or more responses to the user as the estimate,
wherein at a time of presenting two or more responses to the user from two or more providers, present the two or more responses in side by side view on the user device, and present a recommendation, based on the retrieved personal information, that the user use one of the two or more providers even though the ranking of the one provider is lower than the other of the two or more providers.

11. An apparatus of claim 10, wherein the processor is further configured to:
select the one or more providers based on the criteria specified in the first request,
wherein the estimate is representative of cost information, availability information, type of service information, or a combination thereof.

12. An apparatus of claim 11, wherein the criteria include a location, a date, a provider rating, or a combination thereof.

13. An apparatus of claim 10, the processor is further configured to:
receive an input from the user for selecting at least one of the one or more providers.

14. An apparatus of claim 13, the processor is further configured to:
schedule an appointment for the service with the selected at least one of the one or more providers based on the input.

15. An apparatus of claim 14, the processor is further configured to:
transmit at least a portion of the personal information, the anonymized personal information, or a combination thereof to the selected at least one of the one or more providers based on the input.

16. An apparatus of claim 13, the processor is further configured to:
retrieve billing information for the service from the selected at least one of the one or more providers; and
audit the billing information based, at least in part, on the estimate, historical service information, historical provider information, or a combination thereof.

17. An apparatus of claim 16, the processor is further configured to:
identify one or more billing errors, one or more fraudulent charges, one or more deviations from expected costs, or a combination thereof based on the auditing.

18. An apparatus of claim 10, wherein the service is a medical service, and wherein the personal information includes an electronic medical record, insurance information, contextual information associated with the user, or a combination thereof.

* * * * *